Sept. 19, 1967   C. B. GWYN, JR   3,341,943
METHOD OF MAKING ELECTRICAL CONTACT ELEMENTS
Filed Oct. 31, 1962
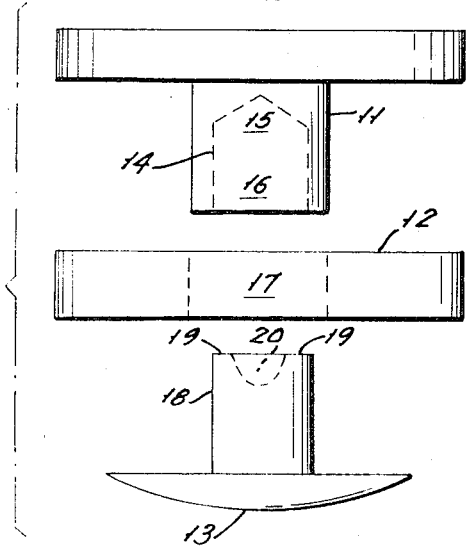
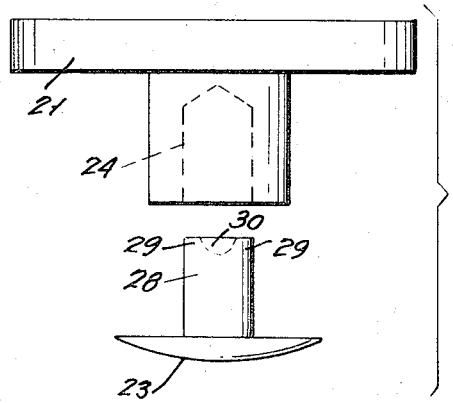
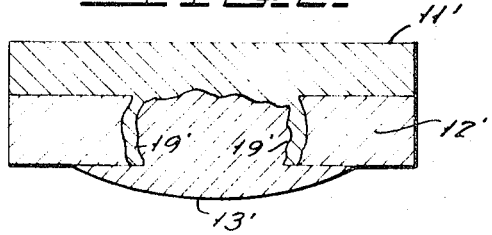
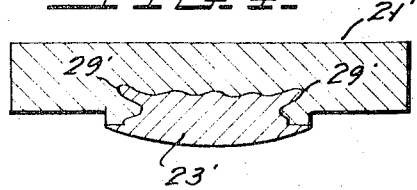
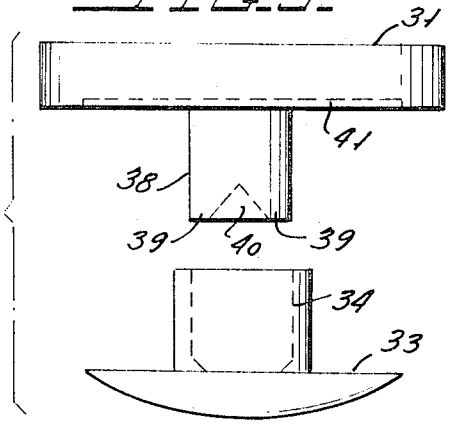
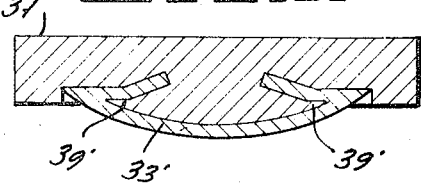
INVENTOR.
CHILDRESS B. GWYN, JR.
BY
OSTROLENK, FABER, GERB & SOFFEN
ATTORNEYS United States Patent Office 3,341,943
Patented Sept. 19, 1967

3,341,943
METHOD OF MAKING ELECTRICAL CONTACT
ELEMENTS
Childress B. Gwyn, Jr., Export, Pa., assignor, by mesne assignments, to Talon, Inc., a corporation of Pennsylvania
Filed Oct. 31, 1962, Ser. No. 234,479
3 Claims. (Cl. 29—630)

This invention relates to a method of making electrical contact elements, and more particularly to such a method for making projection welding type electrical make-and-break contacts.

It is known to make silver-faced composite projection welding type contacts by initially producing a suitable silver face member by punching, blanking or like operations and thereafter bonding a base metal support thereto. In accordance with known procedures, the silver facing is coated with a flux medium and a suitably proportioned processed brazing or soldering material is then coated upon the flux, prior to superimposing the base metal support thereon. While these members are maintained in properly positioned relationship within a jig or other fixture they are heated, in a neutral or reducing atmosphere, at such a temperature and for a sufficient length of time to cause the brazing or soldering medium to melt and flow and to thereby wet and alloy with or otherwise integrate the silver facing and the base metal supporting member. The parts are then maintained in position until they have been cooled below the melting and flow points of the brazing or soldering medium, and the resulting composite contact element is thereafter removed from the mounting jig. This procedure is, however, time consuming and relatively complex and is additionally subject to contamination of the working surfaces of the silver facing by the brazing or soldering media which may seriously impair, if not destroy, the utility of the contact for electrical make-and-break contact purposes.

It is also known to manufacture projection welding contacts by making an overlay or sandwich of the silver facing element and the base metal supporting member, blanking the composite contact therefrom and subsequently coining the contact to the final dimensions desired. While such operations can produce satisfactory contacts there is a concomitant production of relatively large amounts of scrap resulting from the blanking and trimming steps, introducing the necessity to reclaim the silver from the skeleton remaining from the initial blanks.

Yet another procedure for manufacturing projection welding make-and-break contacts is the so-called fusion or puddling techniques disclosed in my prior Patents 2,049,771 and 2,199,240. These procedures are limited to use of contact facing materials which can be melted without changing their desired characteristics and which have lower melting points than the base metal supporting members employed; moreover, such procedures are in general limited to the projection welding contacts having solely two component parts, the silver or suitable electrical contact material facing and the base metal backing.

It is among the objects of the present invention to provide a method for making projection welding type electrical make-and-break contact elements, which method may be utilized to provide efficient large scale production of such contacts.

A further object of the invention is to provide such a method which is relatively inexpensive as compared with previously known procedures.

Other objects and advantages of the invention will become apparent hereinafter.

It has been found that an efficient method of making a projection welding electrical make-and-break contact is provided by aligning a pair of rivet shaped metallic contact components, one of which includes a tubular body having a generally cylindrical recess extending through the shank or tenon portion thereof and the other of which includes a solid cylindrical body adapted to be received within such recess and having shank or shoulder portions defining a depression extending through a minor portion of the cylindrical body, and subsequently pressing the components together, the cylindrical body being received within the recess and the shoulder portions thereof compressing the abutting walls of the tubular body adjacent the recess to form the composite contact element. The shank or shoulder portions of the one contact component expand under pressure within the walls of the tubular body portion of the other contact component which thereby interlock therewith and form an integral composite contact.

For a fuller understanding of the nature and objects of the invention, reference is made to the following detailed description taken in connection with the accompanying drawing showing preferred forms of the invention for purposes of illustration, without limiting the claimed invention to such illustrative instances, and in which:

FIGURE 1 is a schematic illustration of the component parts of a projection welding contact prior to assembly thereof, according to one embodiment of the invention;

FIGURE 2 is a schematic sectional view of the composite contact resulting from assembly of the components shown in FIGURE 1;

FIGURE 3 is a view similar to FIGURE 1 illustrating a further embodiment of the invention;

FIGURE 4 is the composite projection welding contact produced by assembly of the components illustrated in FIGURE 3;

FIGURE 5 is a schematic illustration similar to FIGURE 1, showing the component parts of another projection contact element produced in accordance with the invention; and FIGURE 6 is the composite contact produced by assembly of the components illustrated in FIGURE 5.

Referring initially to the embodiment of the invention illustrated in FIGURES 1 and 2, a tubular rivet shaped component 11 is shown aligned with a washer or disc shaped member 12 and a further rivet shaped component 13 for assembly into a composite projection welding contact (FIGURE 2). The tubular element 11 is desirably constituted of silver and includes a generally cylindrical recess 14 extending longitudinally through the major shank portion thereof. The recess 14 includes a first conically shaped portion 15 and a second cylindrically shaped portion 16 contained within the shank or the end of the tubular element.

The washer 12 which, it will be understood, may be provided in flat, split, dished, shakeproof or similar shapes, is desirably constituted of copper, steel or aluminum. The washer, as noted hereinafter, improves the interlocking engagement between the contact components upon assembly; it has been found that use of the washer component, particularly when composed of copper or aluminum, tends to lessen electrical chatter or bounce. The washer has an aperture 17 extending therethrough; it is preferable, though not essential, that the inner annular wall of the aperture be roughened as by providing a knurled, threaded or like surface thereon, or by providing an irregular shape or contour thereon, e.g., of keg, barrel, stepped or spiral shape. Such roughened surfaces are more readily secured to the rivet shaped component 13 upon assembly of the composite contact.

The component 13, which is desirably of steel, nickel, or aluminum has a solid cylindrically shaped shank or stem 18 including shoulder portions 19 defining a concave depression 20 extending through a minor portion of the shank.

Upon assembling the components 11, 12 and 13, the shank 18 is passed through the aperture 17 in washer 12 and into the recess 14 in component 11. By applying suitable pressure upon the thus superposed components within a die or fixture they are permanently united into the composite projection welding electrical make-and-break contact shown in FIGURE 2. The shoulder portions 19 of the rivet shaped component 13 compress or distort the abutting walls of the recess 14 in the tubular component 11 into the configuration shown, in which the shoulder portions are driven outward to form protuberances shaped as shown at 19' filling the indentations in the recess walls and thereby firmly interlocking therewith. It will be noted that this reshaping is similarly produced in the annular walls of the washer 12 abutting the recess 17 extending therethrough; the thus distorted member 12' exerts inwardly directed compressive forces against the other components to insure firm interlocking engagement of the composite contact.

Another embodiment of the invention is illustrated in FIGURES 3 and 4 in which the washer member 12 has been eliminated. In the resulting contact illustrated in FIGURE 4, the shoulder portion 29 are distorted into the wedge-like configuration 29', forming indentations within the annular walls of the recess 24 and thereby interlocking with the compressed tubular element 21' and defining the integral composite contact. Such projection welding type contact is particularly desirable where use of an intermediate washer member 12 may, due to ambient conditions, produce undesirable so-called "battery actions," galvanic corrosion or the like.

In the embodiment illustrated in FIGURES 5 and 6, the tubular rivet shaped component 31 includes a solid cylindrical body 38 having a conical recess 40 extending through the minor portion thereof, and the opposed rivet shaped component 33 includes the generally cylindrical recess 34 for receiving the tubular body 38. The head of component 31 is indented as at 41 to provide for countersinking component 33 upon assembly of the components. The interlocking members of the resulting composite contact illustrated in FIGURE 6 are thereby reversed as compared with the disposition of components utilized to form the contact elements shown in FIGURES 2 and 4. It is thus apparent that the generally cylindrical recess may be provided in either of the tubular contact components with the generally solid cylindrical body, having shoulder portions defining a depression extending through the minor portion of such body, provided on the opposite of such members, in accordance with the invention. Upon applying suitable pressure the aligned components having these configurations are firmly interlocked and form a permanent projection welding type contact element.

It is preferably to subject the contact components to a high impact force to insure permanent interlocking engagement therebetween, in the manner disclosed in my copending application Ser. No. 228,116, entitled "Method of Forming Electrical Contacts" filed October 3, 1962, and now Patent No. 3,151,385, granted on October 6, 1964. Hence it is preferred to align the opposing components 11, 12 and 13; 21 and 23; and 31 and 33 within a suitable die and subject such elements to a compressive force of at least one ton per square inch, the force being rapidly applied to the aligned elements at a velocity of at least 10 inches per second to thereby form the integrally bonded composite contacts. It will, however, be understood that the present invention is not restricted to the use of these high impact forces to produce the composite contacts, inasmuch as the particular configuration of the mating portions provided on the opposing components insures the interlocking engagement of such members when subjected to compression.

In some instances the union between the contact components is further enhanced by utilizing what may be termed a "hot upset" method in which the working faces of the opposed components are driven toward one another while simultaneously passing an electrical current therethrough to thereby produce an annealing or welding action, and effect a flow of a portion of the material of the solid cylindrical body into the recess of the opposing component when the former forms compressive indentations in the walls of the latter. The heating action may suitably be controlled to cause only annealing of these engaging members or to actually effect fusion or welding of the same, as desired.

Since these and other changes may be made in carrying out the above method without departing from the scope of the invention, it is intended that all matter contained in the above description shall be interpreted as illustrative and not in a limiting sense.

What is claimed is:

1. A method of making projection welding electrical make-and-brake contact elements comprising:
    (a) aligning a pair of rivet shaped metallic contact components, one of said components including a tubular body having a generally cylindrical recess extending through the major shank portion thereof and the other of said components including a solid cylindrical body adapted to be received within said recess and including shoulder portions defining a depression extending through a major portion of the cylindrical body,
    (b) disposing an apertured disc-shaped metallic member annularly of and closely spaced from said tubular body,
    (c) axially inserting said cylindrical body into said recess and axially pressing said components together within a fixture permitting relative component movement therein and driving said shoulder portions of said cylindrical body outwardly to distort and indent the walls of said tubular body adjacent said recess to mechanically interlock said components while simultaneously deforming the disc-shaped metallic member with the outwardly distorting tubular walls to mechanically interlock the components to said disc-shaped member.

2. The method as defined in claim 1, in which a roughened surface is provided on the walls of said apertured disc-shaped metallic member.

3. The method as defined in claim 1, in which said one rivet shaped metallic contact component is constituted of silver and said other of said components is constituted of a metal selected from the group consisting of a ferrous metal, nickel and aluminum.

References Cited

UNITED STATES PATENTS

| 649,153 | 5/1900 | Ashbaugh et al. | 85—39 |
| 1,265,377 | 5/1918 | Poeton | 29—432 |
| 2,393,564 | 1/1946 | Poupitch | 29—522 |
| 2,755,368 | 7/1956 | Wirt et al. | 219—10 |
| 2,896,981 | 7/1959 | Cooney | 287—20.5 |
| 3,030,850 | 4/1962 | Minor et al. | 85—82 |

FOREIGN PATENTS

| 441,367 | 5/1912 | France. |
| 27,896 | 5/1911 | Great Britain. |

JOHN F. CAMPBELL, *Primary Examiner.*

WHITMORE A. WILTZ, *Examiner.*

R. W. CHURCH, D. L. OTTO, *Assistant Examiners.*